United States Patent
Lu

(10) Patent No.: US 8,339,821 B2
(45) Date of Patent: Dec. 25, 2012

(54) ELECTRICAL APPLIANCE AND POWER SUPPLY THEREOF

(75) Inventor: Jian-Hui Lu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 421 days.

(21) Appl. No.: 12/650,550

(22) Filed: Dec. 31, 2009

(65) Prior Publication Data
US 2010/0177539 A1   Jul. 15, 2010

(30) Foreign Application Priority Data
Jan. 13, 2009  (CN) .......................... 2009 1 0300173

(51) Int. Cl.
*H02M 7/155* (2006.01)
(52) U.S. Cl. ........................................................ 363/89
(58) Field of Classification Search .................... 363/89, 363/142, 146
See application file for complete search history.

(56) References Cited

U.S. PATENT DOCUMENTS

| | | | |
|---|---|---|---|
| 5,448,465 A | 9/1995 | Yoshida et al. | |
| 6,225,709 B1 | 5/2001 | Nakajima | |
| 6,297,972 B1 * | 10/2001 | Chen | 363/37 |
| 6,373,733 B1 * | 4/2002 | Wu et al. | 363/89 |
| 7,417,502 B1 | 8/2008 | Cochrane | |
| 7,554,828 B2 * | 6/2009 | Wilson | 363/146 |

FOREIGN PATENT DOCUMENTS
CN   1250315 A   4/2000

* cited by examiner

*Primary Examiner* — Adolf Berhane
(74) *Attorney, Agent, or Firm* — Altis Law Group, Inc.

(57) ABSTRACT

A power supply includes an adapter and a delay module. The adapter is operable to receive an input voltage and convert the input voltage into a first operation voltage to power a load controlled by a control unit. The adapter includes a filter capacitor configured to smooth the first operation voltage. The delay module detects the input voltage, and supplies a second operation voltage to the control unit when receiving the input voltage. The delay module continues supplying the second operation voltage to the control unit for a predetermined time period after the input voltage is no longer supplied to the adapter. As a result, the load operates for at most the predetermined time period and the filter capacitor discharges via the load after the input voltage is removed.

14 Claims, 2 Drawing Sheets

ELECTRICAL APPLIANCE AND POWER SUPPLY THEREOF

BACKGROUND

1. Technical Field

Embodiments of the present disclosure relate to electrical appliances, and particularly to a power supply of an electrical appliance.

2. Description of Related Art

Electrical appliances, such as large liquid crystal displays (LCDs) and televisions, are powered by the mains power (also known as household power, grid power, etc.). Most current electrical appliances include a power supply to convert alternating current (AC) voltages of the mains power into direct current (DC) operative voltages to power components of the electrical appliances. Such power supply typically includes a rectifier and a capacitor. The rectifier converts the AC voltage to the DC voltage, and the capacitor filters out interferences and smoothes the DC voltage. However, the capacitor discharges slowly when the electrical appliances are power off or changed into a power saving mode (only part of the components of the electrical appliances are shut down). Thus taking a long time to shut down the electrical appliances or getting into the power saving mode. This is an inconvenience.

Therefore, an improved power supply for an electrical appliance is needed that addresses the limitations described.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
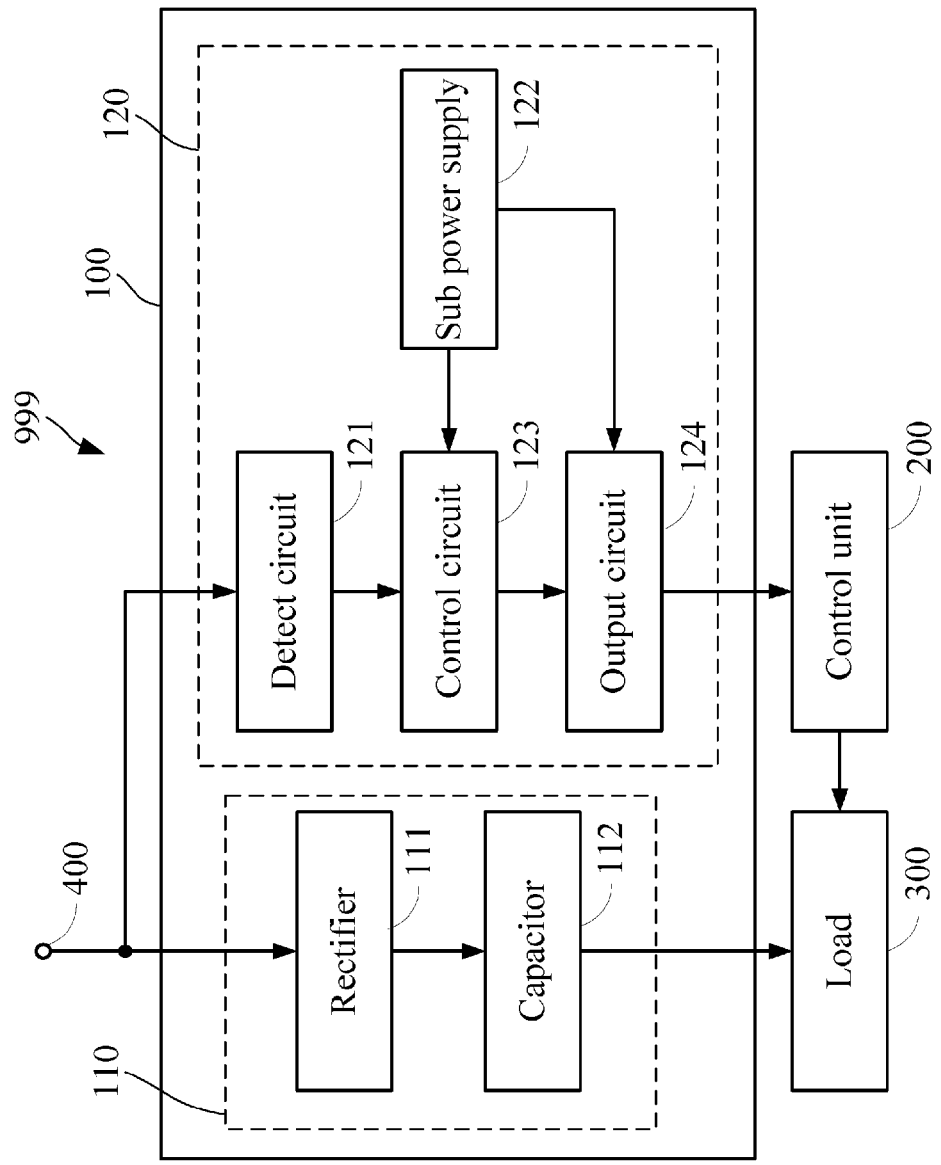
FIG. 1 is a block diagram of an electrical appliance including a power supply in accordance with one embodiment of the present disclosure, the power supply includes a delay module.

Referring to FIG. 1, an electrical appliance 999 in accordance with one embodiment is shown. The electrical appliance 999 may be a liquid crystal display (LCD), a television, a desktop computer, or a media player. The electrical appliance 999 includes a power supply 100, a control unit 200, and a load 300. Understandably, the load 300 may include a display panel and various processing circuits (not shown). The control unit 200 is operable to control operations of the load 300.

The power supply 100 is operable to receive input voltage from an external power supply/source 400, and supply a first operation voltage to the load 300 and a second operation voltage to the control unit 200. The power supply 100 supplies continuous power to the second operation voltage to the control unit 200 for a predetermined time period after the electrical appliance 999 is shut down or after the electrical appliance 999 enters a power saving mode. In the power saving mode, the power supply 100 stops receiving power from the external power supply/source 400, while other components, such as a control chip, of the electrical appliance 999 may still be powered by the external power supply/source 400. In the embodiment, the external power supply/source 400 is the mains power that supplies an alternating current (AC) voltage.

The power supply 100 includes an adapter 110 and a delay module 120. The adapter 110 includes a rectifier 111 and one or more filter capacitors 112. The rectifier 111 is operable to convert the input voltage from the external power supply/source 400 to the first operation voltage. The one or more filter capacitors 112 are configured to filter out interferences and smooth the first operation voltage.

The delay module 120 is configured to detect the input voltage from the external power supply/source 400, and supply the second operation voltage to the control unit 200 when receiving the input voltage from the external power supply/source 400, and continue supplying the second operation voltage to the control unit 200 over/during the predetermined time period after the input voltage is removed. As a result, after the input voltage is removed, the control unit 200 continues controlling the load 300 according to the discharge of the one or more filter capacitors 112. Thus the one or more filter capacitors 112 can discharge rapidly, and the electrical appliance 999 can shut off or enter the power saving mode instantly.

Figure 2:
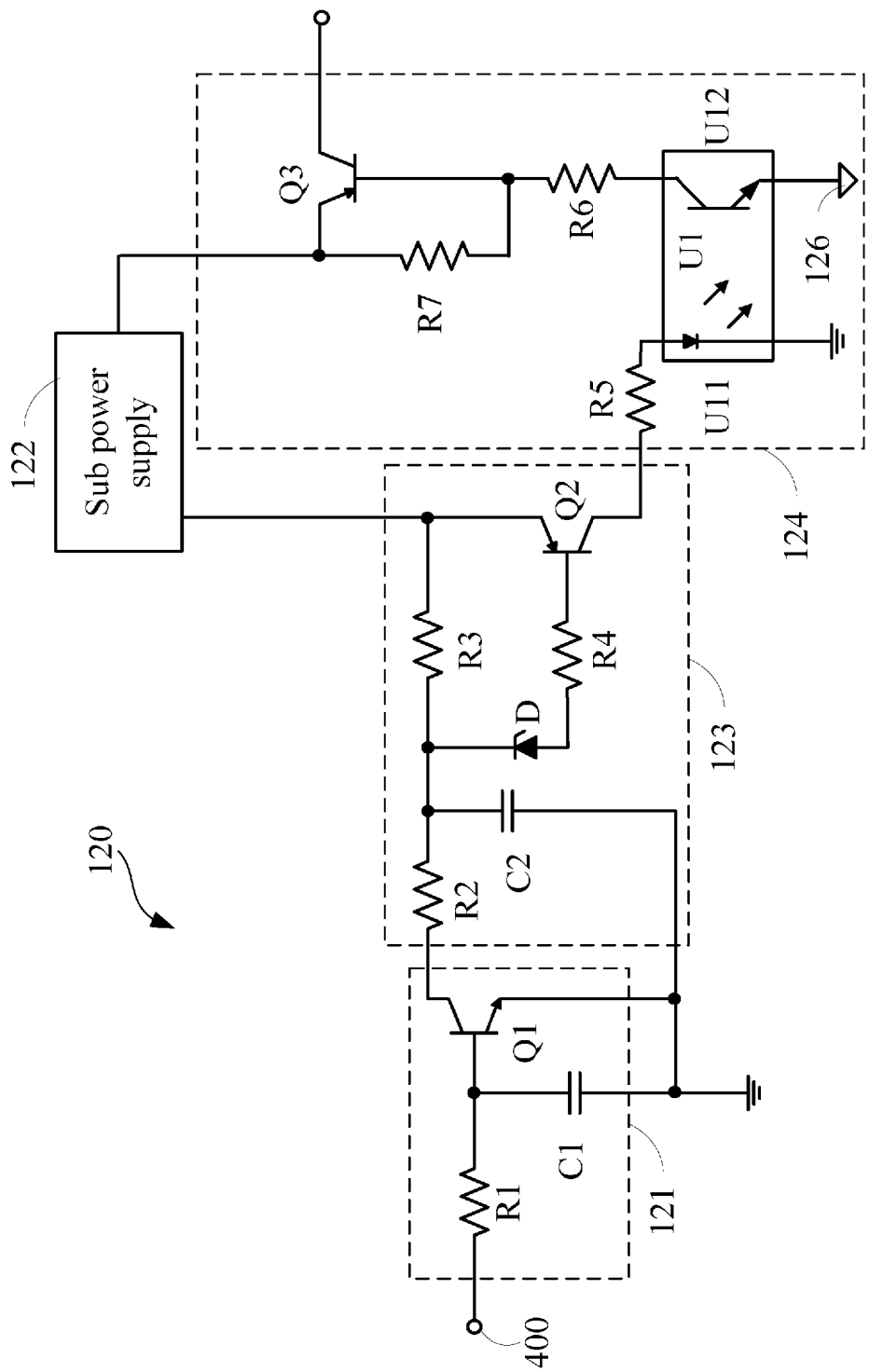
FIG. 2 is a schematic diagram of one embodiment the delay module of FIG. 1.

To achieve the above goal, further referring to FIG. 2, the delay module 120 in one embodiment includes a detect circuit 121, a sub power supply 122, a control circuit 123, and an output circuit 124. The detect circuit 121 is configured to generate a first signal when receiving the input voltage, and a second signal when the input voltage is removed. The first signal is used to signal the control circuit 123 that the input voltage is applied to the load 300, and the second signal is used to signal the control circuit 123 the input voltage is no longer supplied to the load 300. The detect circuit 121 includes a first resistor R1, a first capacitor C1, and a first switching component Q1. A terminal of the first resistor R1 is connected to the external power supply/source 400 to receive the input voltage, and the other terminal of the first resistor R1 is connected to a terminal of the first capacitor C1 and the base of the first switching component Q1. The other terminal of the first capacitor C1 and the emitter of the first switching component Q1 are grounded. The collector of the first switching component Q1 is connected to the control circuit 123. In the embodiment, the first switching component Q1 is an NPN type bipolar junction transistor (BJT).

The sub power supply 122 is operable to supply the second operation voltage to the control circuit 123 and the output circuit 124.

The control circuit 123 is configured to control the output circuit 124 to output the second operation voltage when receiving the first signal, and further control the output circuit 124 to continue outputting the second operation voltage for the predetermined time period when receiving the second signal. The control circuit 123 includes a second resistor R2, a third resistor R3, a fourth resistor R4, a second capacitor C2, a second switching component Q2, and a diode D. In the embodiment, the diode D is a Zener diode. One terminal of the second resistor R2 is connected to the collector of the first switching component Q1. The other terminal of the second resistor R2 is connected to a terminal of the second capacitor C2, the cathode of the diode D, and a terminal of the third resistor R3. The other terminal of the second capacitor C2 is grounded. The anode of the diode D is connected to the base of the second switching component Q2 via the fourth resistor R4. The emitter of the second switching component Q2 is connected to the sub power supply 122 to receive the second operation voltage, and further connected to the other terminal of the third resistor R3. The collector of the second switching component Q2 is connected to the output circuit 124. The second switching component Q2 is a PNP type BJT. A resistance of the third resistor R3 is greater than that of the second resistor R2.

The output unit 124 includes a fifth resistor R5, a sixth resistor R6, a seventh resistor R7, a third switching component Q3, and a photo coupler U. The photo coupler U includes a light-emitting diode (LED) U11 and a phototransistor U12. The terminal of the fifth resistor R5 is connected to the control circuit 123, and the other terminal of the fifth resistor R5 is connected to the anode of the LED U11. The cathode of the LED U11 is grounded. The emitter of the phototransistor U12 is grounded. The collector of the phototransistor U12 is connected to the base of the third switching component Q3 via the sixth resistor R6. The seventh resistor R7 is connected between the base and the emitter of the third switching component Q3. The emitter of the third switching component Q3 is connected to the sub power supply 122 to receive the second operation voltage, and the collector of the third switching component Q3 is configured to output the second operation voltage. The third switching component Q3 is a PNP type BJT.

In operation, when the power supply 100 receives the input voltage, the first switching component Q1 is turned on, and the sub power supply 122 starts outputting the second operation voltage. A voltage at the node between the second and third resistors R2, R3 (the voltage at the second capacitor C2) is a low level voltage, and the diode D and the second switching component Q2 are turned on. Thus the second operation voltage is transmitted to the output circuit 124 via the control circuit 123. Accordingly, the LED U11 is turned on. The phototransistor U12 is turned on, thus a voltage at the base of the third switching component Q3 becomes a low level voltage. The third switching component Q3 is turned on and transmits the second operation voltage to the control unit 200.

When the input voltage is no longer supplied to the power supply 100 and the load 300, the first switching component Q1 is turned off, the adapter 110 stops operating, and the sub power supply 122 continues outputting the second operation voltage to the control unit 200. Accordingly, the second capacitor C2 is charged by the sub power supply 122 via the third resistor R3. The load 300 continues operating under control of the control unit 200, and the one or more filter capacitors 112 start discharging via the load 300 rapidly. Thus, the electrical appliance 999 can shut off or enter the power saving mode instantly.

After the predetermined time period, the voltage at the second capacitor C2 becomes a high level voltage. Accordingly, the diode D is Zener broken down, the second switching component Q2 is turned off. Thus the photo coupler U is turned off, and the voltage at the base of the third switching component Q3 becomes a high level voltage (equal to the second operation voltage). The third switching component Q3 is turned off and stops transmitting the second operation voltage to the control unit 200.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply operable to power a load controlled by a control unit, the power supply comprising:

an adapter operable to receive an input voltage and convert the input voltage into a first operation voltage to power the load, the adapter comprising a filter capacitor configured to smooth the first operation voltage; and a delay module configured to detect the input voltage, and supply a second operation voltage to the control unit when receiving the input voltage, and continue supplying the second operation voltage to the control unit for a predetermined time period after the input voltage is no longer supplied to the adapter, whereby the load operates for at most the predetermined time period and the filter capacitor discharges via the load after the input voltage is removed, and the control unit continues controlling the load during the predetermined time period after the input voltage is no longer supplied to the adapter;

wherein the delay module comprises:

a detect circuit configured to generate a first signal when receiving the input voltage, and a second signal when the input voltage is removed;

a sub power supply operable to supply the second operation voltage;

an output circuit; and a control circuit configured to control the output circuit to output the second operation voltage when receiving the first signal, and further control the output circuit to continue outputting the second operation voltage for the predetermined time period when receiving the second signal.

2. The power supply of claim 1, wherein the delay module comprises a capacitor which is grounded, the capacitor is charged from a low level voltage to a high level voltage during the predetermined time period after the input voltage is removed.

3. The power supply of claim 1, wherein the detect circuit comprises a first resistor, a first capacitor, and a first switching component; a terminal of the first resistor is configured to receive the input voltage, the other terminal of the first resistor is connected to a terminal of the first capacitor and the base of the first switching component, the other terminal of the first capacitor and the emitter of the first switching component are grounded, the collector of the first switching component is connected to the control circuit.

4. The power supply of claim 3, wherein the first switching component is an NPN type bipolar junction transistor (BJT).

5. The power supply of claim 1, wherein the control circuit comprises a second resistor, a third resistor, a fourth resistor, a second capacitor, a second switching component, and a diode; a terminal of the second resistor is connected to the detect circuit; the other terminal of the second resistor is connected to a terminal of the second capacitor, the cathode of the diode, and a terminal of the third resistor; the other terminal of the second capacitor is grounded; the anode of the diode is connected to the base of the second switching component via the fourth resistor; the emitter of the second switching component is connected to the sub power supply to receive the second operation voltage, and further connected to the other terminal of the third resistor; the collector of the second switching component is connected to the output circuit.

6. The power supply of claim 5, wherein the second switching component is a PNP type BJT.

7. The power supply of claim 1, wherein the output unit comprises a fifth resistor, a sixth resistor, a seventh resistor, a third switching component, and a photo coupler;

the photo coupler comprises a light-emitting diode (LED) and a phototransistor; a terminal of the fifth resistor is connected to the control circuit, the other terminal of the fifth resistor is connected to the anode of the LED, the cathode of the LED is grounded; the emitter of the phototransistor is grounded, the collector of the phototransistor is connected to the base of the third switching component via the sixth resistor; the seventh resistor is connected between the base and the emitter of the third switching component; the emitter of the third switching component is connected to the sub power supply to receive the second operation voltage, and the collector of the third switching component is configured to output the second operation voltage.

8. The power supply of claim 7, wherein the third switching component is a PNP type BJT.

9. An electrical appliance, comprising:
a load;
a control unit operable to control operations of the load;
an adapter operable to receive an input voltage and convert the input voltage into a first operation voltage to power the load, the adapter comprising a filter capacitor configured to smooth the first operation voltage; and
a delay module configured to detect the input voltage, and supply a second operation voltage to the control unit when receiving the input voltage, and continue supplying the second operation voltage to the control unit for a predetermined time period after the input voltage is removed, whereby the load operates for at most the predetermined time period and the filter capacitor discharges via the load after the input voltage is removed;
wherein during the predetermined time period after the input voltage is no longer supplied to the adapter, the control unit continues controlling the load;
wherein the delay module comprises:
a detect circuit configured to generate a first signal when receiving the input voltage, and a second signal when the input voltage is removed;
a sub power supply operable to supply the second operation voltage;
an output circuit; and
a control circuit configured to control the output circuit to output the second operation voltage when receiving the first signal, and further control the output circuit to continue outputting the second operation voltage for the predetermined time period when receiving the second signal.

10. The electrical appliance of claim 9, wherein the delay module comprises a first capacitor which is grounded, the first capacitor is charged from a low level voltage to a high level voltage during the predetermined time period after the input voltage is removed.

11. The electrical appliance of claim 9, wherein the detect circuit comprises a first resistor, a first capacitor, and a first switching component; a terminal of the first resistor is configured to receive the input voltage, the other terminal of the first resistor is connected to a terminal of the first capacitor and the base of the first switching component, the other terminal of the first capacitor and the emitter of the first switching component are grounded, the collector of the first switching component is connected to the control circuit.

12. The electrical appliance of claim 11, wherein the first switching component is an NPN type bipolar junction transistor (BJT).

13. The electrical appliance of claim 9, wherein the control circuit comprises a second resistor, a third resistor, a fourth resistor, a second capacitor, a second switching component, and a diode; a terminal of the second resistor is connected to the detect circuit; the other terminal of the second resistor is connected to a terminal of the second capacitor, the cathode of the diode, and a terminal of the third resistor; the other terminal of the second capacitor is grounded; the anode of the diode is connected to the base of the second switching component via the fourth resistor; the emitter of the second switching component is connected to the sub power supply to receive the second operation voltage, and further connected to the other terminal of the third resistor; the collector of the second switching component is connected to the output circuit.

14. The electrical appliance of claim 13, wherein the second switching component is a PNP type BJT.

* * * * *